United States Patent [19]
Shader

[11] 3,708,016
[45] Jan. 2, 1973

[54] LEAF LIFTERS FOR PHOTOELECTRIC PLANT THINNERS
[75] Inventor: Benjamin A. Shader, Golden, Colo.
[73] Assignee: The Evermans Mfg. Company, Denver, Colo.
[22] Filed: Aug. 19, 1971
[21] Appl. No.: 173,011

Related U.S. Application Data
[63] Continuation-in-part of Ser. No. 12,288, Feb. 18, 1970, Pat. No. 2,654,998.

[52] U.S. Cl. ...................172/6, 172/81, 56/317, 171/58
[51] Int. Cl. ................A01b 63/112, A01b 33/00
[58] Field of Search........172/29, 27, 28, 5, 29, 6, 81, 172/538; 56/317, 119; 171/58

[56] References Cited

UNITED STATES PATENTS 3,425,495  2/1969  Reeve et al. ..................172/6 X
3,350,865  11/1967  Ashton et al. ..................56/119
3,468,378  9/1969  Balligand..................171/58

Primary Examiner—Robert E. Pulfrey
Assistant Examiner—Stephen C. Pellegrino
Attorney—R. H. Galbreath

[57] ABSTRACT

A mechanism for lifting obstructing leaves from the path of a photo-electric light beam which is being propelled along and above a plant row for photo-electric thinning purposes. The mechanism includes a gauge wheel rolling along each side of the row and leaf-gathering discs positioned between the gauge wheels and over the row and having first transmission means applying torque from said gauge wheels to the leaf-gathering discs to cause the latter to engage and lift plant leaves above the path of the beam and having a second transmission means for frictionally applying torque from either gauge wheel to the other gauge wheel for driving the two gauge wheels simultaneously in unison.

8 Claims, 9 Drawing Figures

PATENTED JAN 2 1973

INVENTOR
BENJAMIN A. SHADER
BY
R.K. Galbreath
ATTORNEY

INVENTOR
BENJAMIN A. SHADER
BY
ATTORNEY

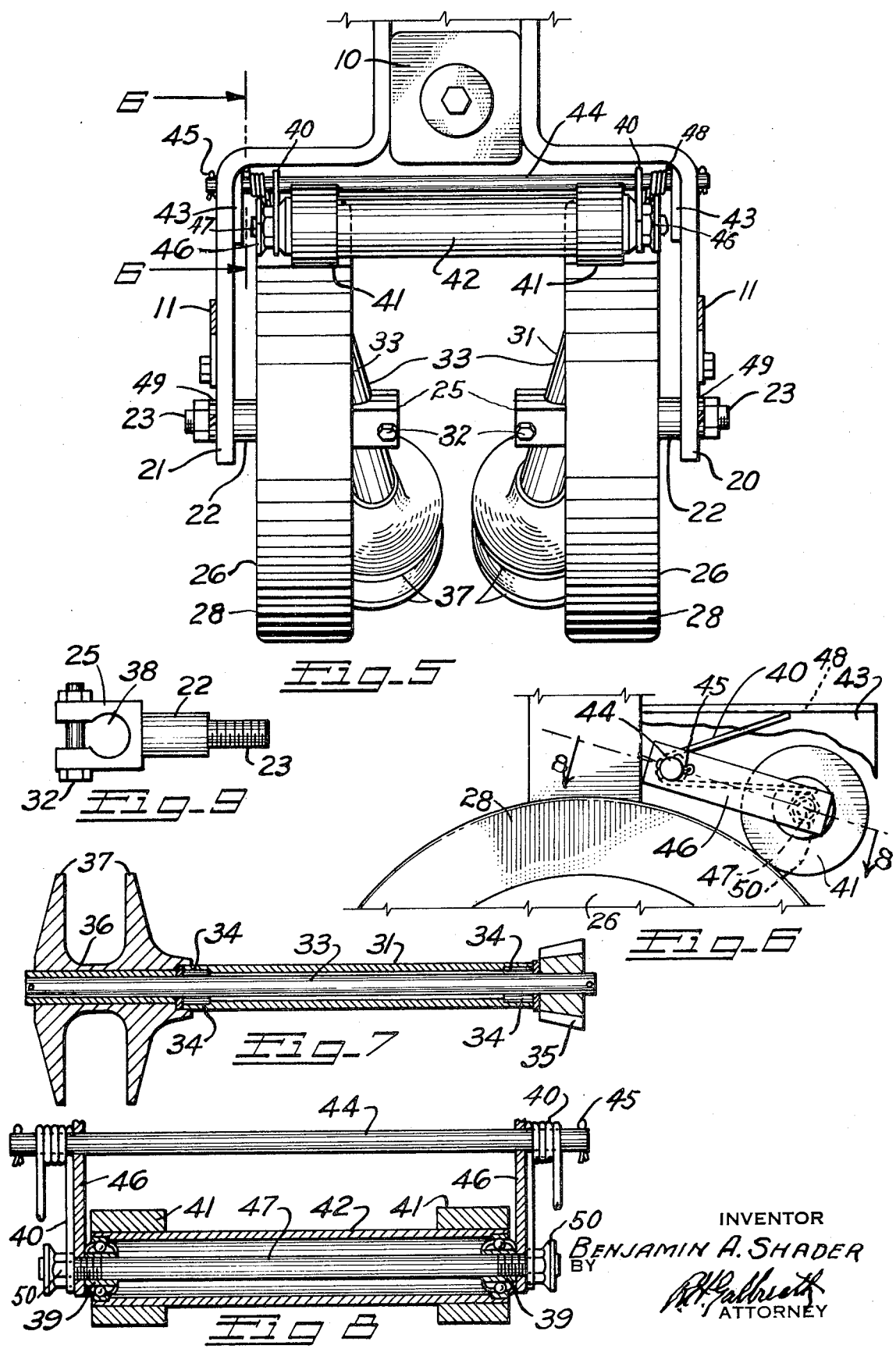

LEAF LIFTERS FOR PHOTOELECTRIC PLANT THINNERS

The invention relates more particularly to a photoelectric plant thinner of the type illustrated and described in applicant's copending application Ser. No. 12,288, filed Feb. 18, 1970, now U.S. Pat. No. 2,654,998 of which this application is a continuation in part.

This invention relates in general to electric row-plant thinners of the type in which rows of sprouted plant seedlings are longitudinally swept by a transversally positioned horizontal photo-electric light beam which will be intercepted by the successive seedlings along the row to electronically actuate suitable root cutting devices, in response to the interceptions of the beam, to thin-out the rows and leave desirable seedlings separated for growth.

One of the principal difficulties encountered with present plant thinners of the above types is to maintain the longitudinal travel path of the photo-electric light beam open and unobstructed so that the light beam can freely reach and accurately register with the row seedlings. Often, due to weather conditions, irregular planting and fertilizing intervals, the leaves of some of the seedlings will be in such close proximity with the ground that they will intercept the travelling beam independently of the seedling stalks so as to produce false electronic actuations of the root cutting devices which make accurate thinning results difficult or impossible.

Therefore, the principal object of the present invention is to provide means in a photo-electric plant thinner which will positively and accurately engage and lift seedling leaves above the plane of the travelling light beam so as to reduce the possibilities of objectionable, unintentional and accidental interceptions of the light beam from actuating the thinner independently of its normal desired thinning actuation.

A further object of this invention is to provide positively driven, side leaf-lifting means at each side of each plant row positioned in lateral alignment with each other and forwardly of the photo-electric beam and to additionally provide means to positively actuate either of the two side-leaf-lifting means from the other side lifting means so that should either side leaf lifting means become self-inoperative due to insufficient field traction it will be simultaneously actuated from the other side lifting means so that both side leaf-lifting means will be constantly, continuously, and simultaneously actuated in unison regardless of any variations in ground traction which may be encountered at either side of each row.

Other objects and advantages reside in the detail construction of the leaf-lifting mechanism of this invention. These will become more apparent from the following detailed description in which reference is made to the accompanying drawings which form a part hereof. Like reference numerals refer to like parts in all views of the drawings and throughout the description.

In the drawings:

FIG. 5 is an enlarged fragmentary front end view taken looking rearwardly on the line 5—5, FIG. 1;

FIG. 6 is an enlarged fragmentary sectional view taken on the line 6—6, FIG. 5;

FIG. 7 is a detail longitudinal section of a pinion shaft tube employed in this invention to be later described;

FIG. 8 is a fragmentary detail section taken on the line 8—8, FIG. 6; and

FIG. 9 is a detail side elevational view of an axle spindle employed herein for mounting the gauge wheels.

Figure 1:
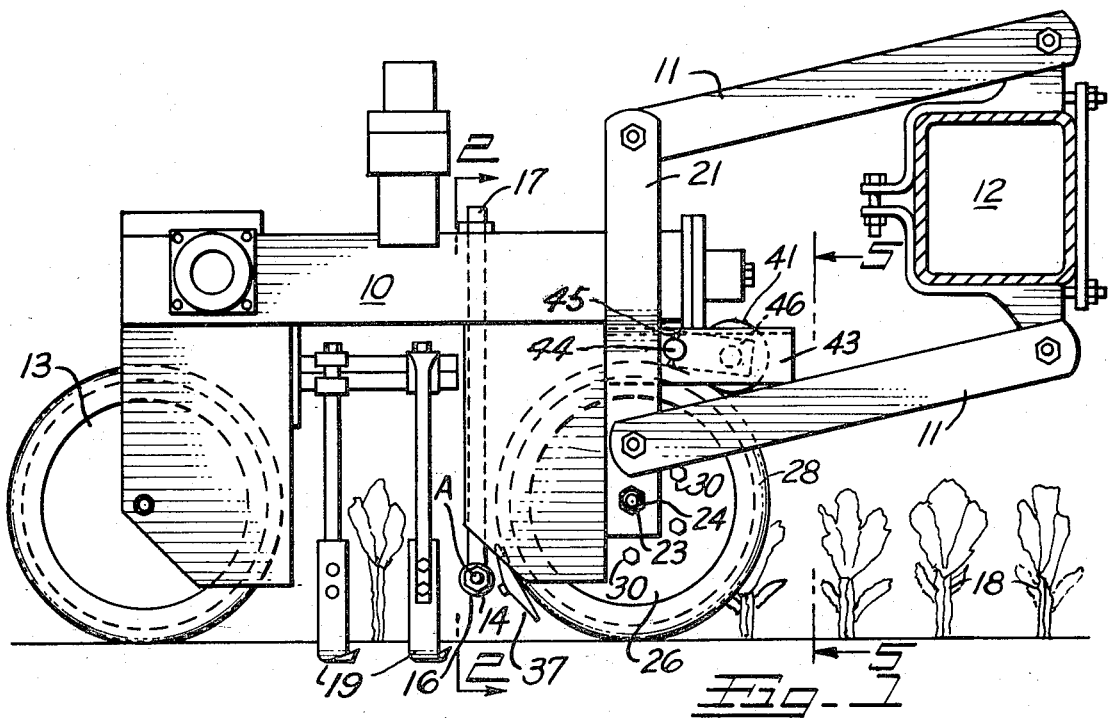
FIG. 1 is a fragmentary, diagrammatic side elevational view of the forward portion of the photo-electric plant thinner of applicant's copending application Ser. No. 12,288, with the leaf-lifting mechanism of the present invention added thereto.

To facilitate description of the leaf-lifting mechanism of the present invention, portions of the photo-electric plant thinner illustrated and described in copending application Ser. No. 12,288 have been shown and described.

Briefly, the thinner of copending Ser. No. 12,288 employs: an elongated rectangular, tubular frame member 10, connected by means of hinged links 11 to a hollow transverse tool bar 12, and supported at its rear extremity on suitable press wheels 13 and at its forward extremity on suitable gauge wheels 26 (to be later described) and having a photo-cell lamp housing 14 supported from the frame member 10 on a tubular leg 15 and arranged to direct a photo-electric light beam A across a plant row to a photo-cell housing 16, supported on a second tubular leg 17 so that the beam will be interrupted by the stalks of seedlings 18 which project upwardly in spaced alignment along a plant row. The actual plant thinning is accomplished by knife blades 19 suitably mounted beneath the frame member 10.

The construction, operation, and functions of the above elements 10, 11, 12, 13, 14, 15, 16, 17, 18 and 19 are fully illustrated and described in detail in the said preceding copending application Ser. No. 12,288 and are shown here to facilitate the description of the construction function, mounting and operation of the leaf lifting mechanism of this invention.

The leaf-lifting mechanism of the present invention is preferably attached to a thinner of the above type by means of a pair of substantially vertical, preformed frame bars 20 and 21 which are secured adjacent their upper extremities in any desired manner to opposite sides of the rear portion of the frame member 10 of the thinner so as to extend oppositely outward and downward in spaced-apart relation on opposite sides of the plant row and forwardly of the photo-electric beam A.

The leaf lifting mechanism of this invention employs axle spindles 22 (such as shown in detail in FIG. 9) which project inwardly in axial alignment with each other from the lower extremities of the frame bars 20 and 21. The spindles 22 are formed at their outer extremities with outwardly projecting threaded axial studs 23 which extend outwardly through their respective frame bars to receive axle clamp nuts 24 provided with lockwashers 49 by means of which the axle spindles 22 may be clamped against axial rotation in their respective frame bars. The inner extremities of the axle spindles are provided with enlarged preferably rectangular split clamping heads 25 to be later described.

A cup-shaped gauge wheel 26 is rotatably mounted, through the medium of a conventional ball-type wheel bearing 27, on each axle spindle 22. The gauge wheels are positioned with their concave faces directed inwardly toward each other and each is provided with an annular ground-engaging tire 28 which contracts about and frictionally grips the periphery of the gauge wheel.

Figure 3:
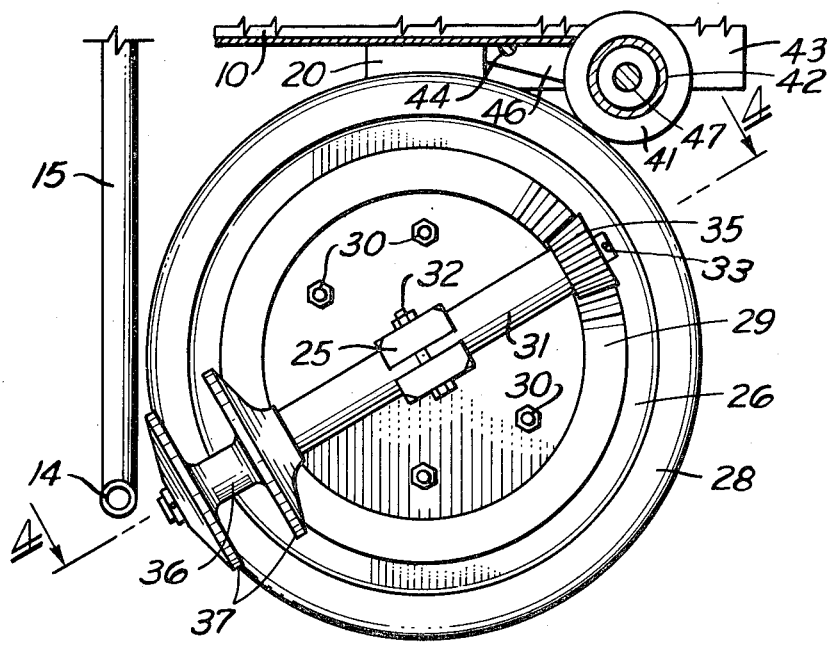
FIG. 3 is a similarly enlarged fragmentary detail section taken on the line 3—3, FIG. 2 illustrating an inside face view of a gauge wheel to be later described.
Figure 4:
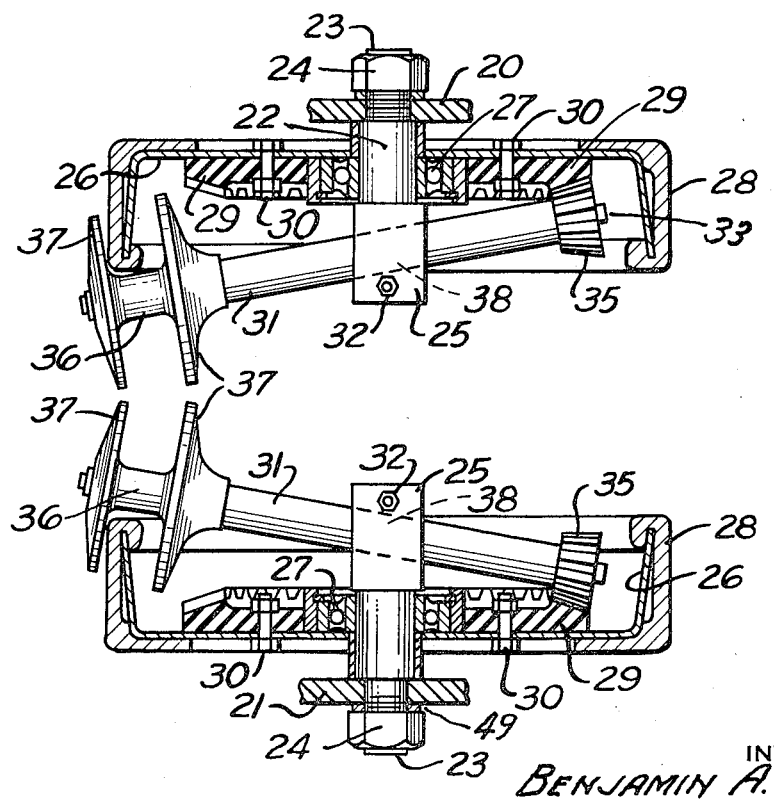
FIG. 4 is a detail fragmentary section taken on the line 4—4, FIG. 3.

For the purposes of this invention a flat, circular, toothed bevel drive gear 29 is concentrically mounted against the inner face of each gauge wheel 26, such as by means of annular series of clamp bolts 30 which extend through the gear and through the web of each wheel and a pinion shaft tube 31 is extended laterally through each of the split clamping heads 25, as shown in FIGS. 3 and 4, and is clamped therein by means of a clamp bolt 32.

A pinion shaft 33 is mounted in bearings 34 in the extremities of the pinion shaft tube 31 and extends outwardly from both extremities of the latter as shown in detail in FIG. 7. A driven bevel pinion 35 is keyed or otherwise fixedly mounted on one extremity of each pinion shaft 33 so as to be constantly in mesh with the bevel drive gear 29 of the adjacent gauge wheel 26 and the other extremity of each pinion shaft is provided with a resilient, flexible, spool shaped leaf roller 36 having two circular spaced apart flexible leaf-gathering discs 37 which are so positioned that when in place the tires 28 of the adjacent wheels will be located between the gathering discs 37, as shown in FIG. 4, and the discs at the opposite sides of the row will be positioned in lateral alignment with and in relatively closely spaced relation with, each other so that the adjacent side of the discs 37 will frictionally engage the leaves along opposite sides of the row, as shown in FIG. 2.

Figure 2:
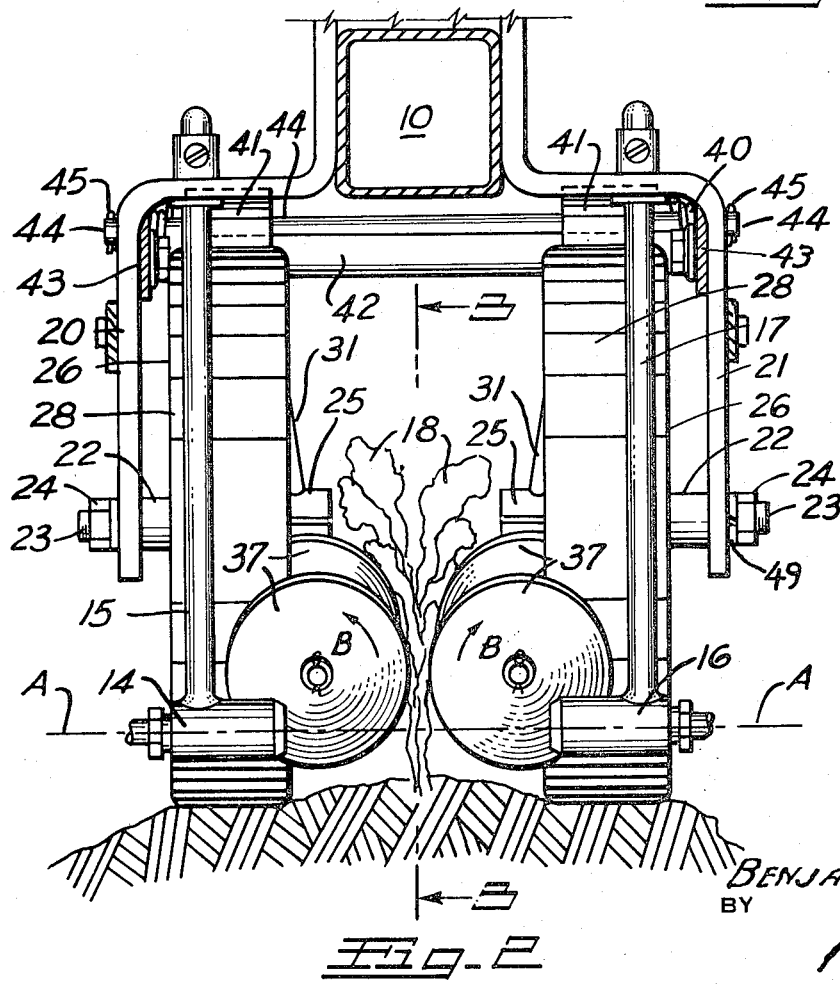
FIG. 2 is an enlarged cross section taken on the line 2—2, FIG. 1.

It can be seen that as the planter is drawn forwardly (to the right in FIGS. 1 and 3), the gauge wheels 26 will travel forwardly along opposite sides of the plant row and the bevel drive gears 29 will positively rotate the adjacent opposite discs 37 upwardly against the leaves, as indicated by the arrows B in FIG. 2, so as to positively elevate the leaves above the path of the light beam A.

The two gauge wheels 26 are urged to rotate in unison by means of friction rollers 41 fixedly mounted on a tubular roller shaft 42 which is spring pressed downwardly in any suitable manner so that the friction rollers will simultaneously contact the tires of both gauge wheels 26 to cause the rotation of each gauge wheel to be frictionally transmitted to the other gauge wheel.

As illustrated, the unison rotation is accomplished by extending a bracket plate 43 forwardly from each of the frame bars 20 and 21 and extending a hinge rod 44 horizontally and transversally through and between the bracket plates 43 and locking it in place by means of suitable cotter keys 45. A connecting link 46 is hingedly mounted on the hinge rod 44 adjacent each extremity of the latter and the links 46 extend forwardly from the hinge rod 44 to support a roller rod 47 about which the tubular roller shaft 42 is rotatably mounted in suitable anti-friction bearings 39. Each connecting link 46 is constantly urged downwardly to press the friction rollers 41 against the wheel tires 28 by means of a torsion wire spring 40 which is medially wrapped about the hinge rod 44 adjacent each of its extremities. The extremities of each spring resiliently flare outwardly between an abutting flange 48 on the bracket plate 43 and a flanged hex nut 50 on the roller rod 47 to constantly and resiliently urge the roller rod downwardly.

The height of the spool shaped leaf rollers 36 above the ground along the plant row can be pre-regulated to suit the particular crop to be worked upon by loosening the axle clamp nuts 24 and rotating the axle spindles 22 to vary the incline of the pinion shaft tubes 31 to any desired angle with the ground surface. The clamp nuts are then retightened to lock the pinion shaft tubes 31 at the readjusted angle.

The pinion shaft tubes 31 may be mounted on the inner extremities of the spindles 22 in any suitable manner. As illustrated, each tube 31 is extended through a lateral, terminal receiving notch 38 formed in the split clamping head 25 of its respective spindle. The two sides of the receiving notch 38 can be drawn toward each other by the bolt 32 so as to firmly lock the pinion shaft tube 31 on its respective axle spindle 22.

It is desired to call attention to the fact that the gear ratio between the bevel drive gear 29 and the bevel pinions 35 and the relative outside diameters between the discs 37 and the wheel tires 28 is such that the outside peripheral speed of the discs is greater than the peripheral speed the tires 28. In fact, in actual practise the discs 37 travel circumferentially approximately 1½ times faster than the ground speed of this improved plant thinner. This greatly improves and increases the leaf-gathering ability of the discs since the leaves are instantly and rapidly swept up so as to override the plants when the latter intercept the beam A, as shown in FIG. 2, so as to reduce the possibilities of overhanging leaf interference.

While the invention has been particularly valuable when used with a photo-electric beam it is to be understood that the use and purpose of the invention is not dependent upon the specific type of the beam A.

While selected forms of the invention have been above described, it is understood that mechanical variations and detail substitutions may be made by one skilled in the art without departing from the spirit of the invention.

Having thus described the invention, what is claimed and desired to be secured by Letters Patent is:

1. A leaf-lifting mechanism, for a photo-electric plant thinner of the type having a photo-electric beam adapted to travel in a substantially horizontal path along a plant row so as to be intercepted by the plants in said row to electronically actuate root cutting devices to desirably space the plants along said row, means for lifting objectionable leaves from the path of said beam comprising:
   a. frame bars extending downwardly from said thinner, therebeing one frame bar at each side of said plant row;
   b. axially aligned spindles extending inwardly from said frame bars toward each other;
   c. a cup-shaped ground driven gauge wheel rotatively mounted on each spindle, the concave sides of said gauge wheels facing inwardly toward each other on opposite sides of said plant row;
   d. a drive gear concentrically mounted in proximity to and on the concave side of each gauge wheel so as to rotate with the latter;

e. a rotatable pinion shaft mounted on the inner extremity of each spindle and extending diametrically of the latter;
f. a pinion gear mounted on the first extremity of each pinion shaft in constant mesh with the adjacent drive gear; and
g. leaf-gathering discs mounted on the second extremity of each pinion shaft in proximity to the periphery of the adjacent gauge wheel to lift leaves when said pinion gear is rotated by said adjacent drive gear.

2. A leaf-gathering mechanism as described in claim 1 having:
a. an enlarged head member fixedly formed on the inner extremity of each spindle;
b. a pinion shaft tube enclosing said pinion shaft between said pinion and said leaf-gathering discs, and extending laterally through said head member; and
c. means for locking said shaft tube in any desired position in said head member.

3. A leaf-gathering mechanism as described in claim 2 in which:
a. the inner extremity of each head member is provided with an axially positioned receiving notch in which the pinion shaft tube is positioned; and
b. the means for locking said shaft tube comprises a bolt which acts to draw the sides of the receiving notch toward each other to grip said pinion shaft tube.

4. A leaf-gathering mechanism as described in claim 2 in which:
a. the spindles can be rotatively adjusted and locked in their respective frame bars to position their respective shaft tubes at desired radial angles with the axis of said spindles to vary the heighth of said leaf-gathering discs above the ground.

5. A leaf-gathering mechanism as described in claim 4 in which:
a. a spool shaped leaf roller is affixed to the second extremity of said pinion shaft, said leaf-gathering discs being formed in axially spaced relation on said leaf roller so that one of said discs will be normally positioned beyond the circumference of the adjacent gauge wheel and another of said discs will be normally positioned within the circumference of the adjacent gauge wheel when said pinion gear of the pinion shaft is in mesh with its drive gear.

6. A leaf-gathering mechanism as described in claim 1 having:
a. means frictionally connecting each gauge wheel with the other gauge wheel to urge unison rotation of said gauge wheels.

7. A leaf-gathering mechanism as described in claim 6 in which the means for frictionally connecting each gauge wheel with the other gauge wheel comprises:
a. a roller shaft;
b. cylindrical friction rollers mounted on said roller shaft in frictional contact with the circumferential periphery of both gauge wheels; and
c. means for urging said roller shaft toward the common axes of said gauge wheels to simultaneously press said friction rollers against the circumferences of both said gauge wheels to unitarily drive the latter.

8. A leaf-gathering mechanism as described in claim 7 having:
a. spring means acting against said roller shaft and resiliently urging said friction rollers against said gauge wheels.

* * * * *